May 13, 1969     W. E. NORTON     3,443,510
GRAVY SAVER BARBECUE DEVICE
Filed March 1, 1967
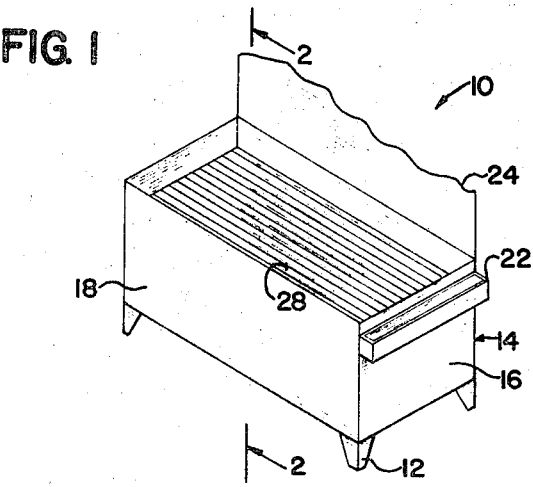
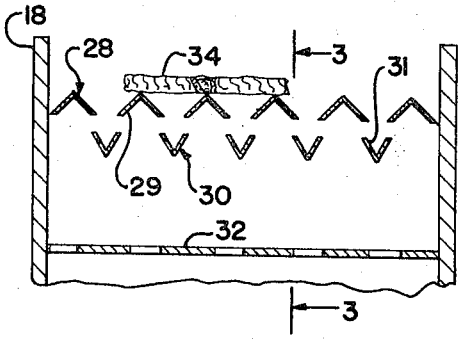
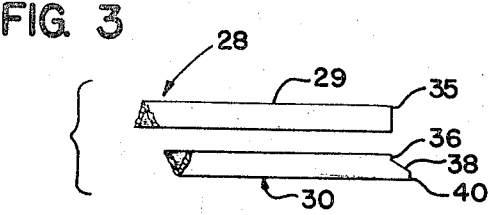
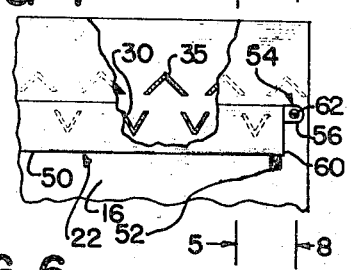
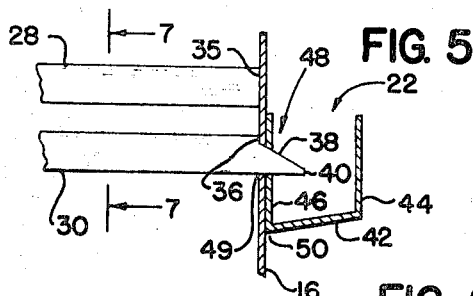
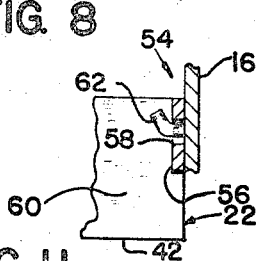
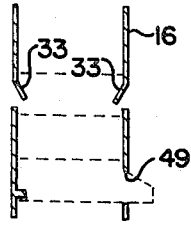
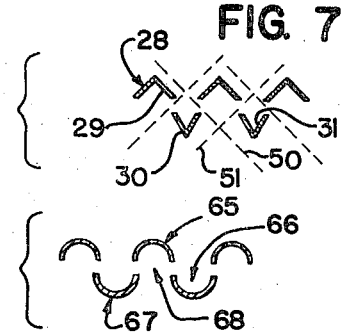
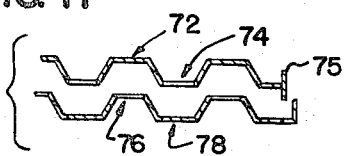
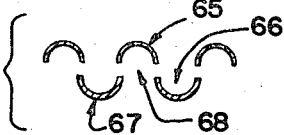
INVENTOR.
WILLIAM E. NORTON
BY
MARCUS L. BATES United States Patent Office 3,443,510
Patented May 13, 1969

3,443,510
GRAVY SAVER BARBECUE DEVICE
William E. Norton, 1406 Emerald,
Odessa, Tex. 79760
Filed Mar. 1, 1967, Ser. No. 619,732
Int. Cl. A47j 27/58
U.S. Cl. 99—445     10 Claims

ABSTRACT OF THE DISCLOSURE

A barbecuing device having a grill assembly comprised of an upper apertured grill member and a lower apertured grill member with the apertures of each member being misaligned with respect to each other whereby meat drippings that normally fall from the meat into the fire are caught by the lower grill member and transferred to a gravy saver reservoir. Heat, smoke, and radiant energy can pass upwardly through the grill assembly and impinge upon the meat supported by the upper grill, yet the meat drippings cannot pass downwardly through the entire grill assembly. Thus the drippings are caught by the lower grill assembly and accordingly combustion of the meat drippings is eliminated.

Background of the invention

This invention is related to an apparatus for cooking food, especially meat products, wherein a grill assembly is provided that includes an upper member that forms a meat supporting grill and a lower member that catches meat drippings and transfers the drippings to a container. The gravy produced by the meat juices and fats that are cooked out of the meat, drip onto the lower member where they accumulate and flow into a receptacle. The grills and the receptacle are removably affixed to a supporting structure in a manner that enables the apparatus to be readily disassembled and cleaned.

Ordinary barbecue cooking grills of the prior art are usually provided with a grill work which is suspended directly over a suitable source of heat, such as charcoal or the like. As the meat is cooked, the juicies that are removed from the meat during the cooking process are free to drop onto the hot burning fuel. As the meat drippings contact the hot burning coals of the fuel supply, a multiplicity of undesirable conditions are brought about which includes the combustion of the drippings causing a large flame to develop over the heat source, thereby burning the meat. This condition causes the meat to cook rapidly thereby depositing unsightly carbonaceous material on the surface of the meat. Another undesirable feature of prior art grills is that the fats or meat drippings which contact the hot coals of the fuel supply are chemically changed into undesirable chemical compositions. These chemicals are condensed or otherwise deposited upon the surface of the meat. Some of these undesirable chemicals are thought to be conductive to the formation of cancer within the human body, as well as having other unhealthy properties.

Summary

It is therefore desirable to provide a barbecue grill of a design that is similar in many respects to barbecue grills of the past art, but yet provides a safe means by which an individual may economically barbecue his own food products in a healthy, easy, and inexpensive manner that has theretofore not been possible.

It is further desirable to provide a barbecue grill that permits radiant energy, convective heat, and the delicious spicy smoke of the fuel (assuming the wood to be oak or mesquite or the like) to flow up through the grill work and impinge upon the meat products, while at the same time preventing the valuable nutritious juices that are cooked from the meat from falling onto the glowing wood coals of the fuel supply.

Another object of this invention is to provide a barbecue grill having a food supporting means and a gravy saving means associated with a gravy reservoir whereby the juices that are cooked from the meat may be accumulated and disposed of in any desired manner.

Still another object of this invention is the provision of a barbecuing device that permits radiant energy, convective heat, and smoke from the heat source to impinge upon the meat products while at the same time preventing juices that are cooked from the meat products from contacting the hot fuel source.

A still further object of this invention is to provide a barbecuing device with a new combination of a grill and a reservoir that cooperate with each other in a manner whereby the juices cooked from the meat are accumulated within the reservoir, and whereby the grill and reservoir may be readily disassembled for purposes of cleaning.

The above objects and desirable attributes of the present invention are attained by the provision of a gravy reservoir and a grill that are associated with a barbecuing device in such a manner that fluid and meat particles that are cooked from the meat are transferred into the reservoir and at the same time the energy from a fuel supply located below the grill may still efficiently pass upward through the grill where it can cook the meat in a sanitary and healthy manner that has not heretofore been possible.

Brief description of the drawings

FIGURE 1 is a partial perspective view generally illustrating the operative relationship of the present invention with respect to a barbecuing or cooking device.

FIGURE 2 is a cross sectional view taken along line 2—2 of FIGURE 1.

FIGURE 3 is a fragmentary elevation showing part of the device seen in FIGURES 1 and 2.

FIGURE 4 is a fragmentary view of still another part of the device seen in FIGURES 1 and 2, with some parts broken away so as to show the details therein.

FIGURE 5 is a partial cross sectional fragmentary view taken along line 5—5 of FIGURE 4.

FIGURE 6 is a fragmentary view of part of the device seen in FIGURES 1 through 5.

FIGURE 7 is a cross sectional view taken along line 7—7 of FIGURE 5.

FIGURE 8 is a cross-sectional view taken along line 8—8 of FIGURE 4.

FIGURE 9 is a longitudinal cross-sectional view of the device seen in FIGURE 1.

FIGURE 10 is a cross-sectional view of a modification of the device seen in FIGURE 7.

FIGURE 11 is a modification of the device seen in FIGURE 10.

FIGURE 12 is a fragmentary cross-sectional view of a part of the device seen in FIGURE 11.

Description of the preferred embodiments

FIGURE 1 shows a barbecuing apparatus, generally indicated by an arrow at numeral 10, that is suitably supported by legs 12. The apparatus includes a boxed-in enclosure 14 having a side 16 and a front 18. Located at the top extremity of one side there is seen a reservoir in the form of a container 22. A lid 24 is optionally provided at the top edge portion of the rear wall. A grill assembly 28 is seen suitably suspended within the enclosure 14.

Looking now to the details of FIGURE 2, in conjunction with the remaining figures, wherein there is illustrated the grill assembly 28 that includes an upper grill member 29 and a lower grill member 30 suitably disposed in the illustrated manner. The upper grill member includes a multiplicity of individual parallel arranged inverted V-shaped elements 29 and the lower grill member includes a multiplicity of parallel arranged V-shaped members 31. As illustrated in FIGURES 2, 4, and 7, upper grill member 29 is misaligned with lower grill member 30 with the outer marginal edge portion of each element 31 overlapping the area described by the spaced apart legs of element 29. A conventional grate 32 is suitably located in spaced apart relationship with respect to the grill 28, for the purpose of supporting a heat source such as charcoal or other suitable material, to enable cooking the meat products illustrated at 34.

The end walls 16 are provided with depending cut-outs or tabs 33 that receive each extremity 35 of the upper grill member 29 to thereby form a suitable support for the upper grill member. The tabs 33 are arranged in a parallel row with each pair of tabs cooperating with each leg of the V-shaped grill member whereby each member is removably supported by gravity in the illustrated manner of FIGURES 2 through 5.

One end portion of lower grill member 30 is provided with a cut-out that forms an abutment 36, an outwardly and downwardly sloping portion 38, and a depending end portion 40 which forms a spout. The opposite end portion is arranged in a manner similar to that of member 28.

The side wall 16 includes the before mentioned reservoir or container 22 and is provided with a lower sloped bottom 42, a vertical upstanding outer wall 44, a vertically apertured upstanding inner wall 46 having a multiplicity of apertures 48 that are each respectively aligned with an aperture 49 provided in the side wall 16. Aperture 49 receives the lower ends or depending portion of the grease collecting and conveying channels of lower grill element 31 that is formed by the before mentioned cut-out 38. Vertical terminal end portion 36 is received in abutting relationship with respect to the wall 16, while the triangular cut-out at 49 provides an aperture through which the depending portion provided by the sloped cut-out at 38 may extend into the receptacle 22. Triangular apertures or cut-outs 48 and 49 are superimposed upon each other in the aligned relationship of FIGURE 5.

The lower edge portion 50 of container 22 is sloped inwardly towards wall 16 as well as from the horizontal towards outlet 52 to thereby permit meat juices collected therein to flow to the outlet. Reservoir 22 is removably attached to the side 16 by the illustrated attachment means indicated generally by the arrow at 54 and includes an apertured lug 56 that slidably receives an upwardly curved and outwardly directed metallic finger 62. The finger is received through the apertures 58 in a manner that supports the reservoir 22 with wall 46 and 16 more or less touching each other in side abutting relationship as seen in FIGURES 4, 5, and 8.

FIGURE 10 illustrates a modification of the device illustrated in FIGURES 1 through 9, wherein there is generally disclosed a multiplicity of U-shaped channels 65 and 67 that may be fabricated into an assembly similar to the previously illustrated upper and lower grills 28 and 30. The depending end of each element 65 and 67 of the grate seen in FIGURE 10 may be cut along the terminal end portion in a manner similar to that illustrated in FIGURE 3, whereby they may be directly substituted for the grill members 28 and 30 by merely changing the configuration of the apertures at 49 and 48.

FIGURE 11 shows still another modification of the invention wherein each member of the grill assembly includes a solid grill member. The upper grill member 72 is provided with multiple downwardly drawn eyelets as seen at 74, and further includes a vertically extending edge member 75 about the edge portion thereof. The lower grill member 78 is likewise provided with upwardly extending drawn eyelets at 76. The drawn eyelets 74 are misaligned with the drawn eyelets at 76, and for all practical purposes the upper and lower grill members may be identical to each other, except for the relative location of the apertures.

FIGURE 12 illustrates the details of the drawn eyelets that form the apertures of the upper and lower grill members. The eyelets are circular drawn holes placed in a plate 76 in a manner similar to driving a drift pin through a hole that has been previously drilled in a piece of sheet metal, so as to draw out the aperture in the illustrated manner.

*Operation*

The operation of the instant device is conventional so far as regards providing a suitable fuel or heat source upon the grate 32, and the manipulation of the food products 34 upon the grill. Assuming a suitable heat source to be provided upon the conventional grate 32, and the food product 34 to be suitably suspended upon the upper grate member 28, the heat source at 32 will provide heated flue gases in the form of smoke and the like that travel upwardly in a tortuous path through the lower grate member 30 and upper grate member 28, thereby cooking the food product by convective heating. The heat source also provides radiant energy which is able to penetrate adjacent elements of each grill member as indicated by the dashed dot lines 50' and 51.

As the food product is cooked, the juices therefrom will run off onto the outwardly and downwardly depending edge portions of each individual element 29 of the upper grate where the juices will then drip into each of the individual elements of the lower grate member 31. Since the depending marginal edge portion of each element 29 is in overhanging relationship with respect to the edge portion of the V-shaped members 31, all of the juices will be collected and conveyed within the channel formed by V-shaped members 31. The lower grill element 30 is slightly sloped in a downward direction with respect to the receptacle 22, and accordingly the juices run down each of the elements 31 to where the spout 40 allows the juices to collect within the receptacle 22. The receptacle 22 is likewise sloped toward the outlet 52 thereof. Accordingly, a container placed under the spout 52 continually collects the juices that are cooked from the food product 34, and the collected juices may be used to continually baste the food product 34. At the end of the day, an accumulation of juices will be on hand and may be either made into gravy, barbecue sauce, or sold for the fat and tallow contained therein.

Since each upper element 29 of the upper grill assembly is removably attached to each sidewall, the elements may be easily lifted from the enclosure 14. Each element 31 of the lower grate member 30 can likewise be lifted out of the enclosure 14 by first lifting the side opposite the spout 40 and then withdrawing the spout 40 from the apertures 48 and 49. In this respect, it is pointed out that the opposite free end of element 31 is attached to the side wall opposite wall 16 in a manner similar to that illustrated at 33 and 35. The receptacle 22 can be removed from the enclosure 14 by merely lifting the receptacle in an upward and outwardly direction whereby the lugs 56 are lifted from the supporting upwardly curved finger 62. Accordingly, all of the parts associated with the food products can be quickly and efficiently removed to thereby enable individual cleaning of each part. The various parts are assembled by reversing the above outlined disassembly procedure.

The modification illustrated in FIGURE 10 also includes longitudinally extending U-shaped elements 65 and 67. The end portion of element 67 is provided with a spout and cooperates with the walls 16 and 46 in a manner similar to that illustrated in FIGURE 5, and since the cooperation of the elements 65 and 67 with the remaining structure is identical to that illustrated in FIGURES 1 through 9, it will be evident to those skilled in the art that the operation is essentially identical to that set forth in detail above.

In the modification illustrated in the drawings by FIGURE 11, it should be understood that the upper grate member 72 is formed from a single piece of sheet metal by providing drawn outlets 74 therein, as well as an upturned marginal edge portion 75 that rests against the side walls 18. The lower grate member 76 is provided with off-set drawn eyelets 76 that are misaligned with the before mentioned drawn eyelets 74. Accordingly, each of the grates 72 and 76 are removed as an integral unit when it is desired to clean the apparatus. The number of spouts provided between the receptacle 22 and the lower grate member 78 need not be as generous as required in the foregoing embodiments.

The present invention provides a sanitary and low cost grill that avoids the health hazards associated with barbecue grills of the past art. Furthermore, the gravy saver offers economic advantages in addition to an improved barbecued food product since the natural juices are all recovered and may be used in basting the food products. When deemed desirable, additional seasoning and flavoring may be added directly to the receptacle 22 to provide an excellent barbecue sauce. While the present invention precludes meat juices including fat, tallow, and the like from dropping onto the fuel source, the invention still permits treating the food products with the favor derived from the fuel source. For example, hickory, oak, or mesquite wood that is burned on the grate 32 as a fuel source will still impart the desired flavor into the food product 34, and at the same time the undesirable effect and the disadvantages caused by the dripping combustibles from the food product onto the fuel source is avoided.

The invention in its broader aspects is not limited to the specific processes and mechanisms shown and described but departures may be made therefrom within the scope of the accompanying claims without departing from the principles of the invention and without sacrificing its chief advantages.

Having now described my invention in accordance with the statutes, I claim:

1. In a cooking apparatus having structure associated therewith for supporting a fuel supply and a grill assembly, with the grill assembly being disposed in heat transfer relationship with respect to the fuel supply, the improvement comprising;
    said grill assembly including an upper grill member for supporting material to be cooked and a lower grill member for collecting substance cooked from the material;
    said upper grill member having means forming a multiplicity of apertures therein;
    said lower grill member comprising a multiplicity of parallel, spaced apart grease collecting and conveying channels;
    said upper and lower grill members being arranged with respect to each other whereby said apertures of said upper grill member are aligned with respect to said grease collecting and conveying channels;
    a reservoir having side walls associated therewith;
    said reservoir having means for enabling it to be removably attached to the cooking apparatus in a location adjacent to said lower grill;
    one of said side walls having means forming spaced apart apertures therethrough for receiving the lower ends of said channels therethrough;
    whereby: substance cooked from the material on the upper grill member will be collected on the lower grill member and transferred to said reservoir, and heat energy flows upwardly along a tortuous path with the path being defined by the apertures located in the upper and lower grill members.

2. The improvement of claim 1, wherein the means forming the apertures of the upper grill is arranged in a horizontal plane and directed in a downwardly direction, and the means forming the apertures of the lower grill are directed in an upward direction.

3. The improvement of claim 1, wherein said upper grill member is comprised of a multiplicity of parallel arranged inverted trough-like members, aligned in a horizontal plane;
    said lower grill member is comprised of a multiplicity of parallel arranged trough-like members;
    the marginal edge portion of adjacent members of said upper grill member are arranged in overhanging relationship to the marginal edge portion of the individual members of the lower grill members;
    whereby: heat energy flows upwardly through the grill assembly while substance cooked from the material is caught by the lower grill member.

4. The improvement of claim 1, wherein said upper grill member is comprised of a sheet of metal having means forming a multiplicity of downwardly directed drawn eyelets therein;
    said lower member is comprised of a sheet of metal having means forming a multiplicity of upwardly directed drawn eyelets therein;
    said drawn eyelets of said upper grill member being misaligned with respect to the drawn eyelets of said lower grill member;
    whereby: heat energy flows upwardly along a tortuous path through the apertures of the grill assembly while substance cooked from the material on the upper grill member flows downwardly through the upper apertures to be caught by the lower plate forming the lower grill member.

5. The improvement of claim 1 wherein said upper grill member is arranged in a horizontal plane while said lower grill member is arranged at an angle with respect to said upper grill member.

6. In a cooking apparatus having structure associated therewith for supporting a fuel supply and a grill assembly with the grill assembly being disposed above the fuel supply, the improvement comprising:
    said grill assembly including an upper grill member for supporting material to be cooked and a lower grill member for collecting substance cooked from the material;
    said upper grill member being comprised of a sheet of material having means forming a multiplicity of apertures therethrough and formed to provide parallel spaced apart food supporting members;
    said lower grill member being comprised of a sheet of material having means forming a multiplicity of apertures therethrough and formed to provide spaced apart grease collecting and conveying members;
    said apertures of said upper grill member being misaligned with respect to the apertures of said lower grill member;
    said lower grill member grease conveying channels terminating as a multiplicity of spouts with each said spout depending from one edge portion of said lower grill member;
    a reservoir having side walls associated therewith;
    said reservoir being attached to the cooking apparatus at a location adjacent said one edge portion of said lower grill member;
    apertures in one of said side walls for receiving each said spout therethrough;
    whereby: substance cooked from the material supported on the upper grill member will be collected on the lower grill member, and transferred by gravity to the reservoir by means of said spout.

7. The improvement of claim 6 wherein the means forming the apertures of the upper grill is arranged in a horizontal plane and directed in a downwardly direction, and said means forming the apertures of the lower grill are directed in an upward direction.

8. The improvement of claim 6 wherein said upper grill member is comprised of a sheet of metal having means forming a multiplicity of downwardly directed drawn eyelets therein;
- said lower member is comprised of a sheet of metal having means forming a multiplicity of upwardly directed drawn eyelets therein;
- said drawn eyelets of said upper grill member being misaligned with respect to the drawn eyelets of said lower grill member;
- whereby: heat energy flows upwardly along a tortuous path through the apertures of the grill assembly while substance cooked from the material on the upper grill member flows downwardly through the upper apertures to be caught by the lower plate forming the lower grill member.

9. The improvement of claim 6 wherein said upper grill member is arranged in a horizontal plane while said lower grill member is arranged at an angle with respect to said upper grill member; and
- said reservoir having means by which it is removably attached to the remainder of the apparatus.

10. In a cooking device having structure associated therewith for supporting a grate and a grill assembly with the grill assembly disposed above the grate, the improvement comprising:
- said grill assembly including an upper grill member for supporting material to be cooked and a lower grill member for collecting substance cooked from the material;
- said upper grill member having means forming a multiplicity of apertures therein,
- said lower grill member having means forming a multiplicity of apertures therein;
- said upper and lower grill members being arranged with respect to each other whereby said apertures are misaligned with respect to one another to thereby form a tortuous path for flue gases rising from the grate;
- said upper grill member being comprised of a sheet of metal, and said means forming a multiplicity of apertures therein comprised a multiplicity of downwardly directed drawn eyelets therein;
- said lower member is comprised of a sheet of metal, and said means forming a multiplicity of apertures therein comprised a multiplicity of upwardly directed drawn eyelets therein;
- said lower grill member comprising a series of spaced apart grease collecting and conveying channels, sloped from the horizontal, which terminate as individual spouts, with each said spout depending from one edge portion of said lower grill member;
- a reservoir having side walls associated with said lower grill member;
- said reservoir having means for being removably attached to the cooking device adjacent the lower end of said lower grill; and
- apertures in said side walls for receiving said spouts which protrude therethrough and extend into said reservoir.

References Cited

UNITED STATES PATENTS

| | | | |
|---|---|---|---|
| 265,391 | 10/1882 | Cottingham. | |
| 541,534 | 6/1895 | Haffcke. | |
| 806,475 | 12/1905 | Koneman | 99—446 |
| 842,695 | 1/1907 | Peters | 99—445 |
| 1,007,323 | 10/1911 | Betts | 99—446 |
| 1,614,661 | 1/1927 | Detwiler | 99—446 |
| 1,748,741 | 2/1930 | Tanaki | 99—446 XR |
| 2,253,834 | 8/1941 | Volks. | |
| 2,940,381 | 6/1960 | Cottongim et al. | 99—445 |

FOREIGN PATENTS

| | | |
|---|---|---|
| 332,190 | 10/1903 | France. |
| 760,993 | 12/1933 | France. |
| 6,749 | 6/1905 | Great Britain. |
| 26,136 | 11/1903 | Great Britain. |
| 211,634 | 1/1941 | Switzerland. |

WALTER A. SCHEEL, *Primary Examiner.*

J. M. NEARY, *Assistant Examiner.*

U.S. Cl. X.R.

99—446